United States Patent [19]
Suzuki

[11] Patent Number: 5,979,966
[45] Date of Patent: Nov. 9, 1999

[54] COWLING BRACE OF MOTORCYCLE

[75] Inventor: Takayuki Suzuki, Hamamatsu, Japan

[73] Assignee: Suzuki Kabushiki Kaisha, Hamamatsu, Japan

[21] Appl. No.: 09/050,178

[22] Filed: Mar. 30, 1998

[30] Foreign Application Priority Data

Mar. 31, 1997 [JP] Japan ................................. 9-081302

[51] Int. Cl.$^6$ .................................................. B62J 17/00
[52] U.S. Cl. ........................................................ 296/78.1
[58] Field of Search ................................. 296/78.1, 192

[56] References Cited

FOREIGN PATENT DOCUMENTS

| 0275285 | 11/1989 | Japan | 296/78.1 |
| 404133886 | 5/1992 | Japan | 296/78.1 |
| 404287784 | 10/1992 | Japan | 296/78.1 |

*Primary Examiner*—Dennis H. Pedder
*Attorney, Agent, or Firm*—Finnegan, Henderson, Farabow, Garrett & Dunner, L.L.P.

[57] ABSTRACT

A motorcycle is provided with a cowling brace having a sub-frame structure for attaching a cowling and a cowling peripheral part to a front head portion of a body frame of a motorcycle. The cowling brace is composed of a front brace member integrally formed of a synthetic resin material, a rear brace member assembled by using a metal material to be combined with the front brace member, a front fixture member formed integrally with the front brace member and adapted to fix the cowling and the cowling peripheral part, and a rear fixture member formed to rear brace member and adapted to fix the rear brace member to the body frame of the motorcycle.

8 Claims, 6 Drawing Sheets

COWLING BRACE OF MOTORCYCLE

BACKGROUND OF THE INVENTION

The present invention relates to a cowling brace supporting a cowling of a motorcycle.

For motorcycles, there have been manufactured a large number of types of models each in which a front head portion of a body is covered by a streamlined cowling so that a rider may be protected from a running wind pressure while decreasing an air resistance at the time of the running with an improved outer appearance.

Such a cowling is attached to the front head portion of the body frame of the motorcycle through a cowling brace mounted as a sub-frame structure. Furthermore, cowling peripheral parts such as a head lamp, a meter panel, and a rear view mirror are also attached to the cowling brace.

An existing cowling brace is integrally assembled by using a metal pipe or a press-molded metal plate, and various types of brackets and stays for attaching the cowling and the cowling peripheral parts, are welded thereto. Furthermore, there is also provided a cowling brace, in which only the stay portion for attaching the rear view mirror is separately formed to be attached to a main body of the motorcycle by means of bolt.

The cowling peripheral parts including the head lamp are attached to the cowling brace in a vibration isolating manner through cushioning members formed of elastic materials such as a rubber so as to prevent the vibration from reaching to each of the parts from the body and the engine.

However, as described above, since a cowling brace supporting a large number of various types of parts has an extremely complexed shape, and further, since it is assembled by utilizing a number of press molding and welding processes, it is difficult to keep the dimensional accuracy and to carry out the manufacturing process. There has been also provided a problem that if the positions of the brackets and stays get out of order only by a little amount, it is difficult to accurately mate, in positions, the divided portions of the cowling with each other, so that the beauty of the motorcycle may extremely be degraded and attachment of parts may become impossible.

Furthermore, although the cowling peripheral parts are attached to the cowling brace in a vibration isolating manner, it is difficult to completely absorb the vibration, and there has been a possibility that the durability and function of each part may be lowered. For example, there has been such a problem that a filament of a bulb of the head lamp becomes easy-to-cut by the vibration, or that the visual field of the rear view mirror becomes dim.

SUMMARY OF THE INVENTION

An object of the present invention is to substantially eliminate defects or drawbacks encountered in the prior art described above and to provide a cowling brace of a motorcycle capable of being easily manufactured with a simple structure and a high dimensional accuracy.

Another object of the present invention is to provide a cowling brace of a motorcycle having a structure capable of providing an improved vibration isolating ability of a cowling peripheral part and improving the durability and functions of the parts from lowering.

A further object of the present invention is to provide a cowling brace of a motorcycle capable of increasing a rigidity of a body of the cowling brace so that a heavy head lamp or the like may stably be held.

These and other objects can be achieved according to the present invention by providing a cowling brace of a motorcycle having a sub-frame structure for attaching a cowling and a cowling peripheral part to a front head portion of a body frame of a motorcycle, the cowling brace comprising:

a front brace member integrally formed of a synthetic resin material;

a rear brace member assembled by using a metal material to be combined with the front brace;

a front fixture member formed integrally with the front brace member and adapted to fix the cowling and the cowling peripheral part; and a rear fixture member formed to rear brace member and adapted to fix the rear brace member to the body frame.

In preferred embodiments, the cowling brace further comprises a cushioning member formed of an elastic material and disposed between the front brace member and the rear brace member so that the front brace member is mounted to the rear brace member to be floatable.

The front brace has a ring-shaped structure surrounding a periphery of a head lamp in a front view of the cowling brace. The ring-shaped structure comprises an annular peripheral frame portion and a vertical stay portion. A plurality of reinforcing rib members are formed integrally with a rear side of the annular peripheral frame portion of the front brace member.

The rear brace member comprising a brace pipe, a brace holder welded to a rear edge of the brace pipe, an upper bracket and a lower bracket which are welded to upper and lower ends of the brace pipe.

The front brace member is fastened to the cowling at a plurality of portions by fastening means.

According to the structure mentioned above, since the front brace is formed of a synthetic resin and, at the same time, various types of fixture portions for fixing the cowling and the cowling peripheral parts are integrally formed with the front brace, it is unnecessary to attach these fixture portions to the front brace lately, and further, there are no press-molded portion and no welded portion which may easily damage the dimensional accuracy, so that the front brace will provide a high dimensional accuracy and will be easily manufactured.

On the other hand, in the rear brace, since it is only necessary to provide a fixture portion to the body frame and it is unnecessary to weld a large number of other fixture portions, the structure of the rear brace may also become simple. Further, since the cowling brace is completed only by combining the front brace and the rear brace, a cowling brace with a simple structure and a high dimensional accuracy can easily be manufactured.

Furthermore, the cowling peripheral parts attached to the front brace are, together with the front brace, mounted floatingly to the rear brace. Therefore, if the cowling peripheral parts are attached floatingly to the front brace, too, a double floating portion can be provided between the cowling peripheral parts and the rear brace, and the ability of vibration isolation of the cowling peripheral parts is extremely improved so that the lowering of durability and function may be prevented.

Furthermore, the rigidity of the own body of the front brace can be increased, and therefore, a heavy head lamp or the like can stably be held.

The nature and further characteristic features of the present invention will be made more clear from the following descriptions made with reference to the accompanying drawings.

DESCRIPTION OF THE PREFERRED EMBODIMENTS

An embodiment of the present invention will be described hereunder with reference to the accompanying drawings.

Figure 1:
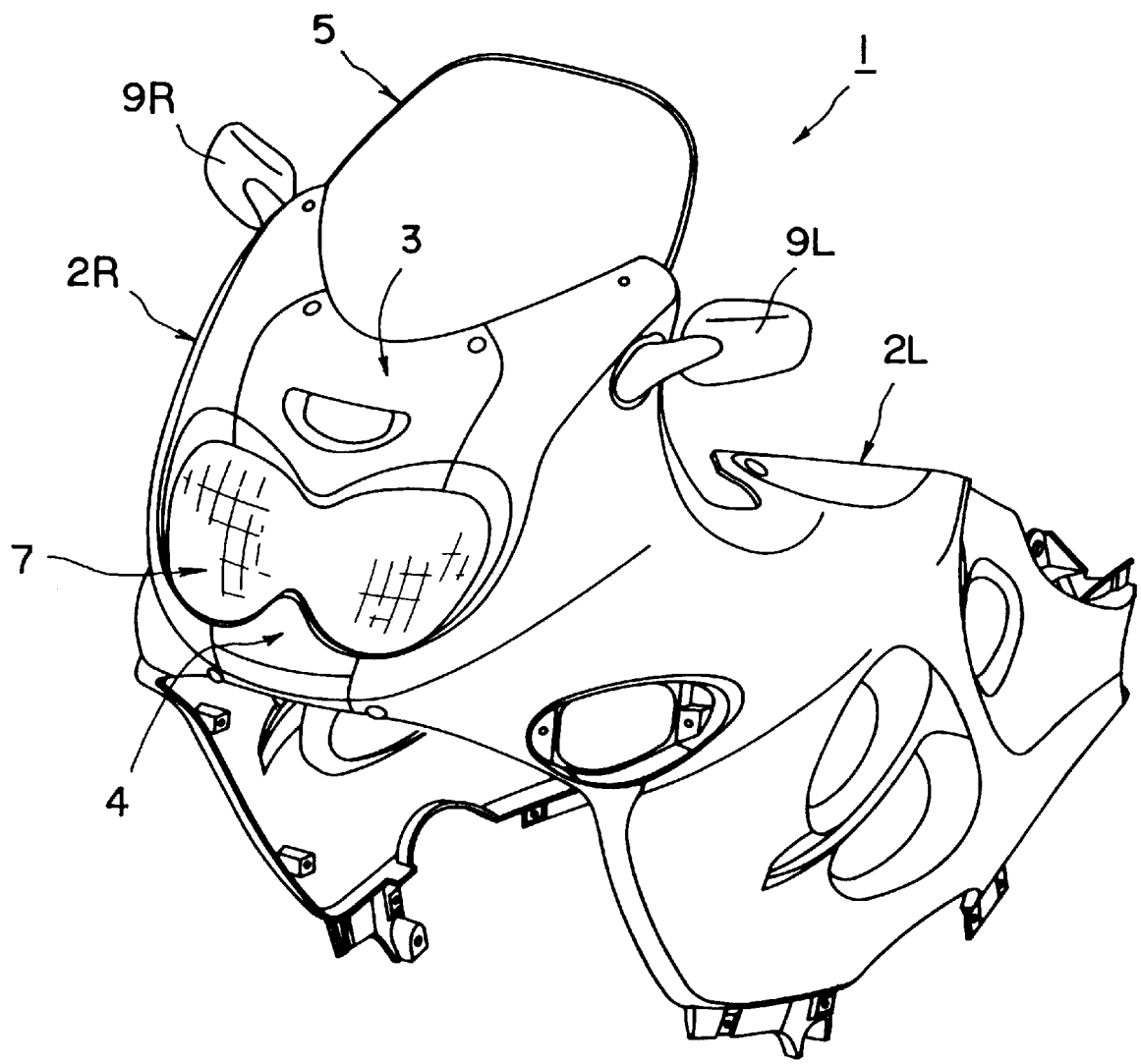
FIG. 1 is an illustration showing an example of a cowling of a motorcycle.

With reference to FIG. 1, a cowling 1 is composed of a pair of left and right side cowls 2L, 2R formed of a synthetic resin material, an upper panel 3 and a lower panel 4 connecting the central portions of the cowls, and a transparent wind screen 5 located at the top portion of the cowling 1. The cowling 1 has an entire structure designed like a stream-line-shape covering the front head portion of a body of a motorcycle.

Furthermore, a head lamp 7 is mounted as being surrounded by the left and right side cowls 2L, 2R, the upper panel 3 and the lower panel 4, and a meter panel 8 is attached inside the wind screen 5. Furthermore, a pair of left and right rear view mirrors 9L, 9R are provided near the upper ends of the left and right side cowls 2L, 2R.

Meanwhile, a cowling brace 11 is formed as a sub-frame structure by combining a front brace 12 integrally formed of a synthetic resin material and a rear brace 13 assembled by using a metal material. The cowling 1 and the cowling peripheral parts such as the head lamp 7, the meter panel 8 and the rear view mirrors 9L, 9R are attached to the front brace 12, and the rear brace 13 is attached to the front head portion (head pipe) of a body frame 14 as shown in FIG. 4.

Figure 3:
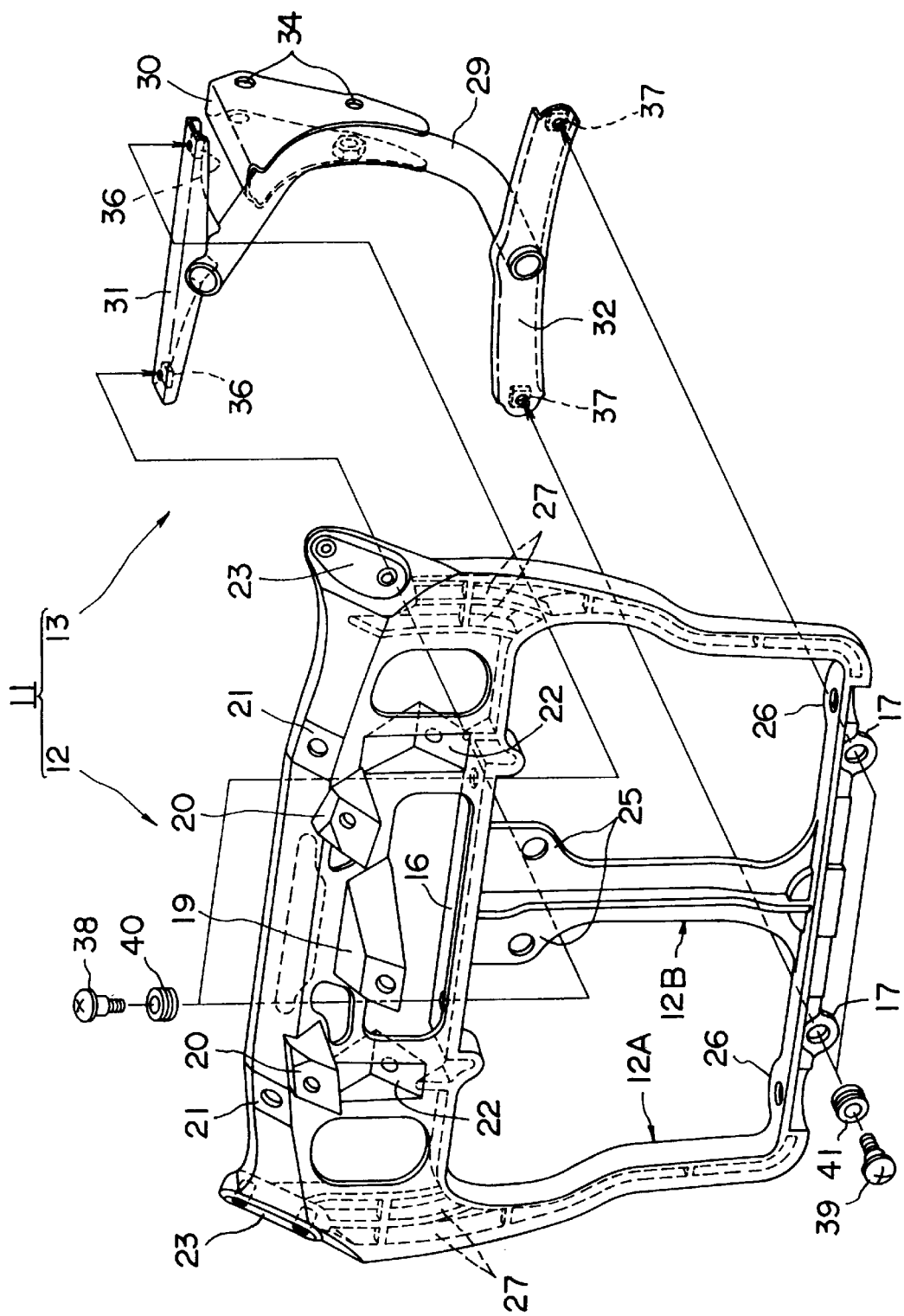
FIG. 3 is a developed illustration of a cowling brace showing an embodiment of the present invention.

The front brace 12 is formed in shape of a ring surrounding the periphery of the head lamp 7 in the front view. Specifically, it has a shape in the front view like a [日]-shape laid sideways, and the front brace 12 comprises, as shown in FIG. 3, a peripheral ring-shaped frame portion 12A and a stay portion 12B vertically crossing at the central portion thereof. A horizontal plate-like upper connection piece 16 and lower connection pieces 17, 17 are formed, respectively, on the upper side and the lower side of the ring-shaped frame portion 12A, Furthermore, as shown in FIG. 4 and FIG. 5, on the upper side of the ring-shaped frame portion 12A of the front brace 12, a screen fixture portion 19 is formed in the central portion thereof, and on the left and right sides, cowling fixture portions 20, 20, upper panel fixture portions 21, 21, lower panel fixture portions 22, 22, and mirror fixture portions 23, 23 are arranged. Furthermore, at the upper portion of the vertical stay portion 12B, a pair of left and right lamp upper fixture portions 25, 25 are provided, and on the lower side, a pair of left and right lamp lower fixture portions 26, 26 are provided. The above mentioned connection pieces 16, 17 and each of the fixture portions 19 to 26 are all formed integral with the front brace 12. Moreover, on the rear surface side of the ring-shaped frame portion 12A of the front brace 12, a plurality of reinforcing ribs 27 are integrally formed.

On the other hand, the rear brace 13 is composed of a brace pipe 29 formed by bending a metal pipe, and a brace holder 30, an upper bracket 31 and a lower bracket 32 which are made by the sheet metal press. The brace pipe 29 is bent such that the middle portion thereof projects backward in an attached state, and the brace holder 30 is welded to the rear edge of the bent portion thereof. Furthermore, the upper bracket 31 and the lower bracket 32 have a cross-section having a ⊐-shape, and they are welded respectively to the upper end and the lower end of the brace pipe 29 so as to extend in the width direction of the motorcycle. Accordingly, the rear brace 13 has a shape like an [H] laid sideways in the front view. By the way, the brace holder 30 is a part to be the fixture portion to the body frame 14.

Figure 2:
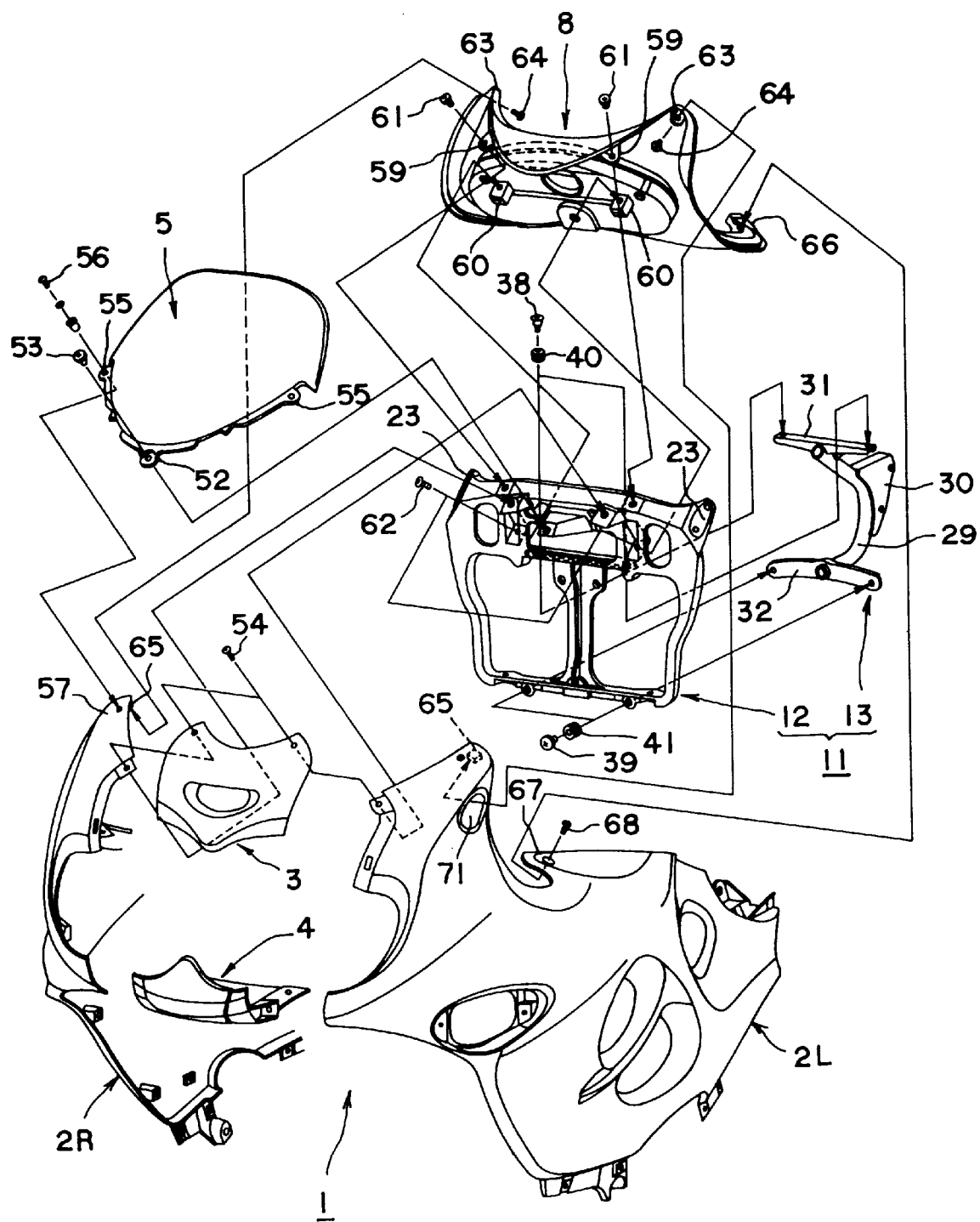
FIG. 2 is a developed illustration showing a cowling, a cowling brace and cowling peripheral parts.
Figure 4:
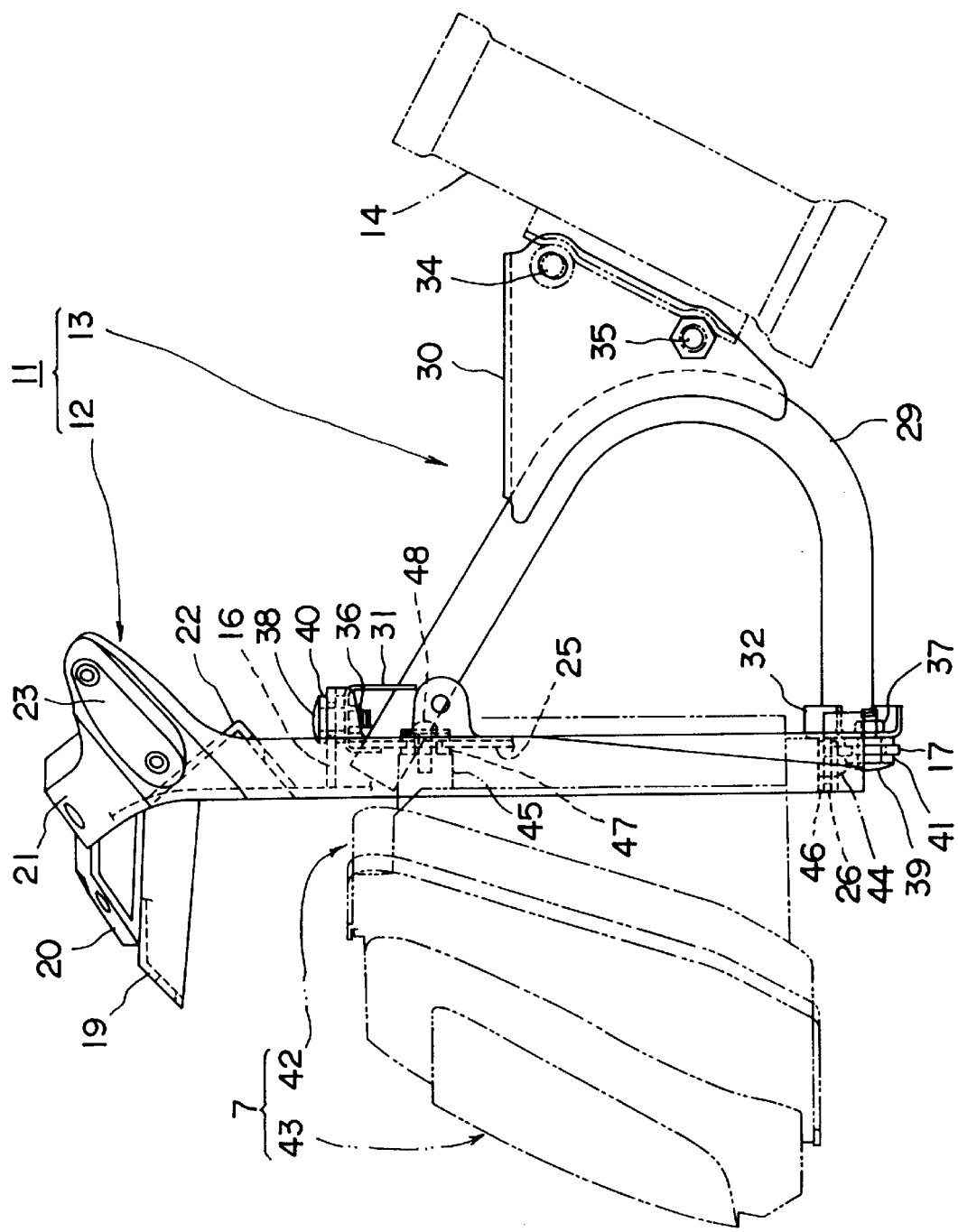
FIG. 4 is a left side view showing the front head portion of a body frame and a cowling brace and a head lamp.
Figure 5:
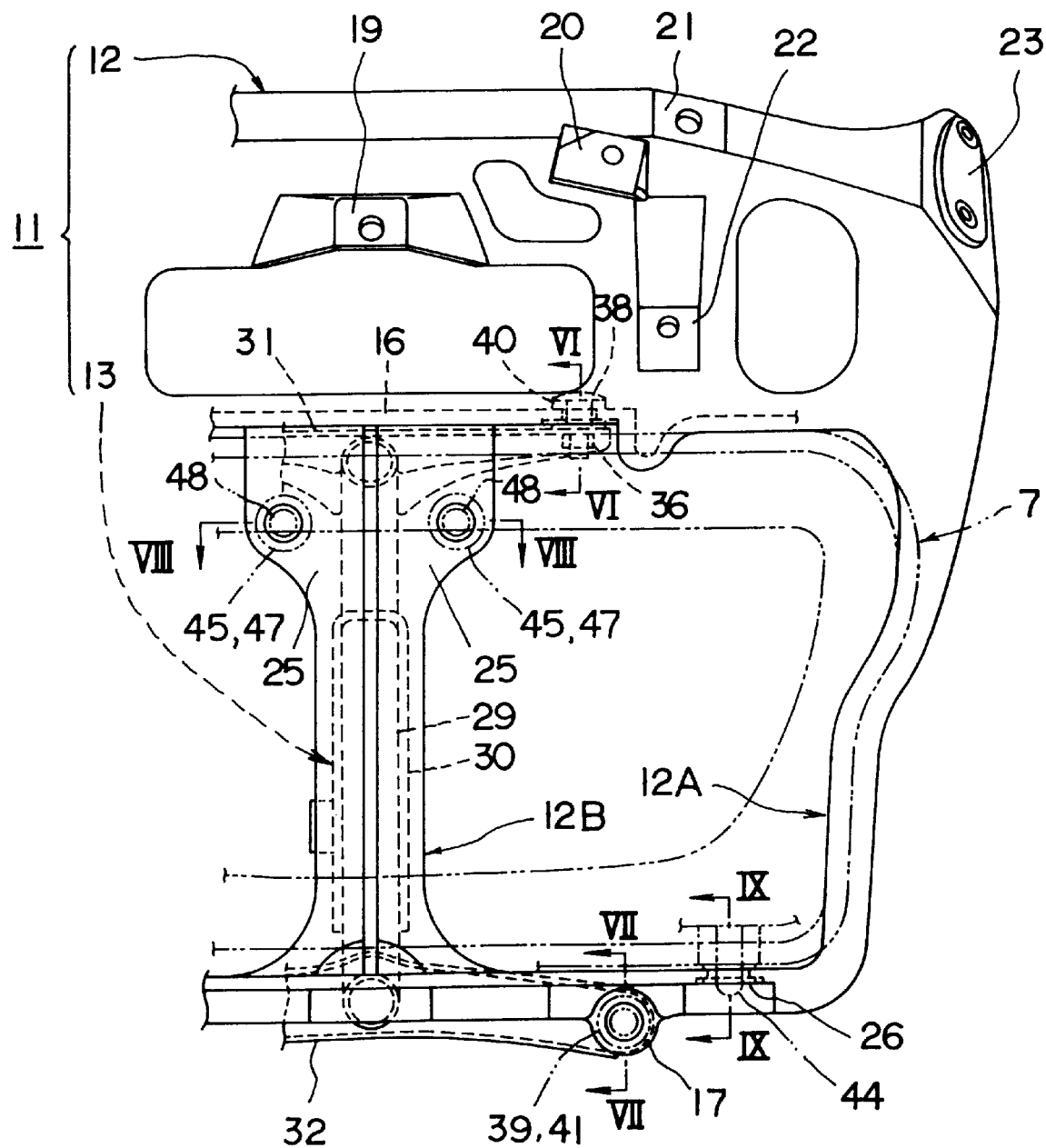
FIG. 5 is a front view showing a cowling brace and a head lamp.

Two pieces of upper and lower fixing holes 34, 34 are pierced into the brace holder 30, and these parts are fastened and fixed to the head pipe of the body frame 14 by two through bolts 35 (refer to FIG. 4). On the other hand, at both left and right ends of the upper bracket 31 and the lower bracket 32, a total of four pieces of fixing nuts 36, 36, 37, 37 are provided. As shown in FIG. 2 and FIG. 3, two pieces of shoulder bolts 38, 38 passing through the upper connection piece 16 of the front brace 12 are fastened to the fixing nuts 36, 36 of the upper bracket 31, and two pieces of shoulder bolts 39, 39 passing through the lower connection piece 17 of the front brace 12 are fastened to the fixing nuts 37, 37 of the lower bracket 32.

Figure 6:
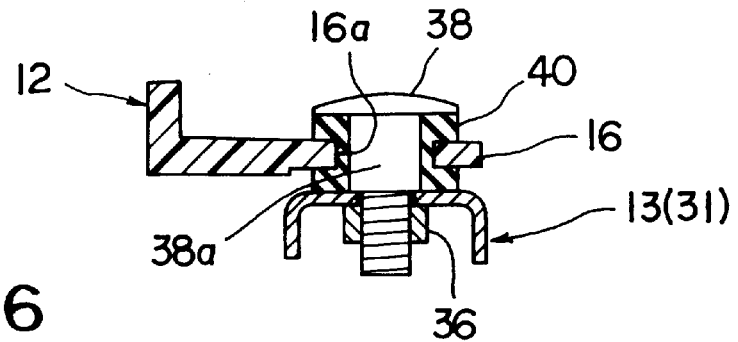
FIG. 6 is a cross-sectional view taken along the line VI—VI in FIG. 5.
Figure 7:
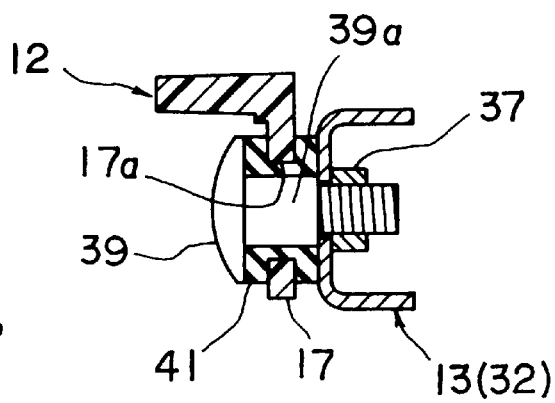
FIG. 7 is a cross-sectional view taken along the line VII—VII in FIG. 5.

As shown in FIG. 6 and FIG. 7 in an enlarged scale, ring-shaped cushioning members 40, 40, 41, 41 made of an elastic body such as a rubber have previously been fitted into bolt insertion holes 16a, 17a of the upper and lower connection pieces 16, 17 of the front brace 12, and into these cushioning members 40, 40, 41, 41, step portions 38a, 39a of each of the shoulder bolts 38, 38, 39, 39 are closely inserted. Accordingly, the fastening force of each of the shoulder bolts 38, 38, 39, 39 is not transmitted to the cushioning members 40, 40, 41, 41, and the cushioning members 40, 40, 41, 41 are arranged between the front brace 12 and the rear brace 13 in a manner such that the front brace 12 is attached floatingly to the rear brace 13.

Figure 8:
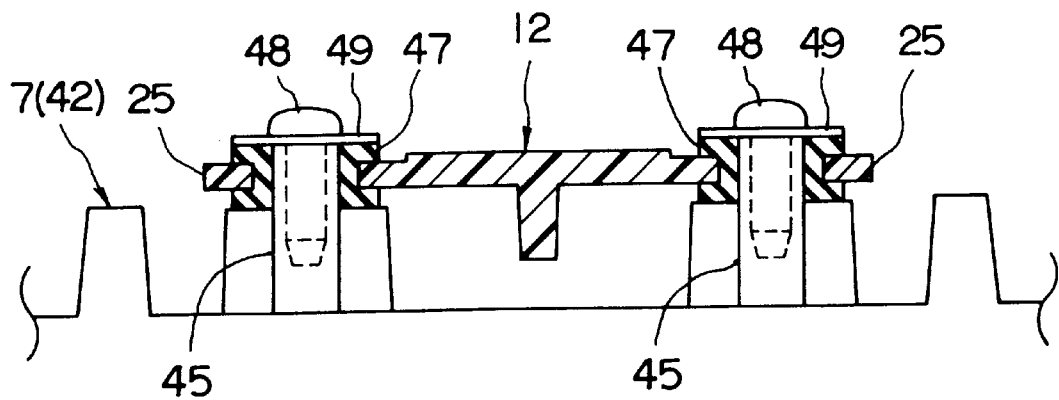
FIG. 8 is a cross-sectional view taken along the line VIII—VIII in FIG. 5.
Figure 9:
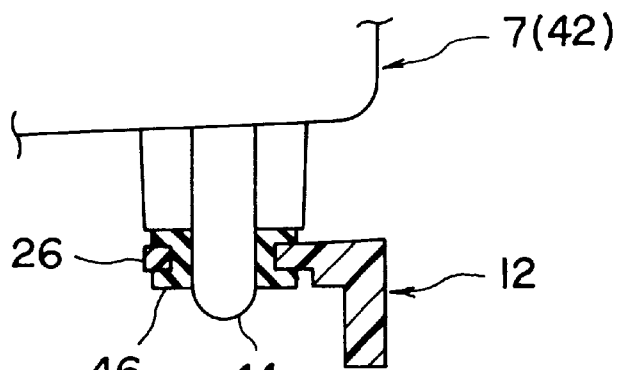
FIG. 9 is a cross-sectional view taken along the line IX—IX in FIG. 5.

By the way, as shown in FIG. 4, the head lamp 7 has a box-shaped structure by combining a lamp body 42 and a lamp lens 43. As shown in FIG. 5, FIG. 8 and FIG. 9, a pair of left and right connection projections 44, 44 extending downward are formed to the lower surface of the lamp body 42, and a pair of left and right fastening mountings 45, 45 extending backward are formed to the rear surface of the lamp body 42.

Then, the connection projections 44, 44 of the head lamp 7 are inserted from the upper side thereof into the ring-shaped cushioning members 46, 46 (formed of an elastic material such as a rubber) previously fitted in the lamp lower fixture portions 26, 26 of the front brace 12. On the other hand, the fastening mountings 45, 45 of the head lamp 7 are closely inserted from the front side into the ring-shaped cushioning members 47, 47 previously fitted in the lamp upper fixture portions 25, 25 of the front brace 12, and to these fastening mountings 45, 45, two pieces of screws 48 are fastened together with washers 49, 49 from the rear side. Accordingly, the head lamp 7 is floatingly attached to the front brace 12 by the elasticity of the four pieces of cushioning members 46, 46, 47, 47.

Next, the relationship of fixture between the cowling 1 and the cowling peripheral parts, and the cowling brace 11 will be described.

As shown in FIG. 2 and FIG. 3, a fastening piece 52 provided at the front end of the wind screen 5 constituting the cowling 1 is fixed to the screen fixture portion 19 of the front brace 12 by means of screw 53. Two pieces of left and right screws 54 connecting the side cowls 2L, 2R and the upper panel 3 constituting the cowling 1 are fastened to the cowling fixture portions 20, 20 of the front brace 12. Moreover, fastening pieces 55, 55 provided at the left and right edge portions of the wind screen 5 are fastened to fastening mountings 57, 57 provided at the upper end portions of the side cowls 2L, 2R by means of screws 56.

Furthermore, a pair of left and right fastening pieces 59, 59 provided at the front edge of the meter panel 8 and a pair of left and right fastening mountings 60, 60 provided, in a projecting manner, to the lower surface of the meter panel 8 are fixed to the upper panel fixture portions 21, 21 and the lower panel fixture portions 22, 22 of the front brace 12 by means screws 61, 62, respectively. Furthermore, fastening pieces 63, 63 are provided at both left and right corners on the front side of the meter panel 8 and are fixed to fastening mountings 65, 65 formed on the rear surface sides at the top portions of the side cowls 2L, 2R by means of screws 64. Fastening pieces 67, 67 provided at the middle portions of the side cowls 2L, 2R are fixed by means of screws 68 to fastening mountings 66, 66 provided at both left and right corners on the rear side of the meter panel 8.

Furthermore, near the upper ends of the side cowls 2L, 2R, mirror attachment holes 71, 71 are formed so as to accord with the positions of the mirror fixture portions 23, 23 of the front brace 12, and to these parts, the left and right rear view mirrors 9L, 9R shown in FIG. 1 are mounted and then fixed to the mirror fixture portions 23, 23 by means of screws or bolts.

In this cowling brace 11, the meter panel 8, and the rear view mirrors 9L, 9R, are integrally provided to the front brace 12 thereof, the fixture portions 19, 20, 21, 22, 23, 25, 26 for fixing the cowling 1 and the various types of cowling peripheral parts such as the head lamp 7. Since these fixture portions 19, 20, 21, 22, 23, 25, 26 are formed integrally with the front brace 12 formed of a synthetic resin, it is unnecessary to attach these fixture portions 19, 20, 21, 22, 23, 25, 26 to the front brace 12 later, and further, there are no press-molded portion and no welded portion which easily cause the miss in the dimensional accuracy, so that the front brace 12 may have a high dimensional accuracy and may be easily manufactured.

On the other hand, in the rear brace 13, since it is only necessary to provide the brace holder 30 as the fixture portion to the body frame 14 besides the upper bracket 31 and the lower bracket 32 and it is unnecessary to weld a large number of other fixture portions, the structure of the rear brace 13 is made extremely simple. Then, since the cowling brace 11 is completed only by combining the front brace 12 and the rear brace 13, the cowling brace 11 with a simple structure and a high dimensional accuracy can easily be manufactured.

Furthermore, since the cushioning members 40, 40, 41, 41 are positioned between the front brace 12 and the rear brace 13 and the front brace 12 is attached floatingly to the rear brace 13, the cowling peripheral parts such as the head lamp 7 and the rear view mirrors 9L, 9R mounted to the front brace 12 are also mounted floatingly onto the rear brace 13 together with the front brace 12.

Therefore, for example, if the head lamp 7 is, as like that of the present embodiment, attached floatingly to the front brace 12, a double floating portion can be provided between the head lamp 7 and the rear brace 13. Consequently, the ability of vibration isolation of the head lamp 7 is extremely improved, so that the cut-off of filaments or the like may effectively be prevented. Furthermore, if the rear view mirrors 9L, 9R are attached floatingly to the front brace 12, the ability of vibration isolation of the rear view mirrors 9L, 9R are similarly and extremely improved, so that the vagueness of the visual field can be prevented.

Furthermore, since in this cowling brace 11, the front brace 12 is formed in a ring-shape surrounding the periphery of the head lamp 7 in the front view, the rigidity of the own body of the front brace 12 is increased, and consequently, the heavy head lamp 7 or the like can stably be held.

As described above, according to the present invention, while forming the front brace from a synthetic resin, various types of fixture portions for fixing the cowling and the cowling peripheral parts are formed integrally with the front brace, so that it is unnecessary to attach these fixture portions to the front brace later. Furthermore, there are no press-molded portion and no welded portion which easily cause the miss in the dimensional accuracy, so that the front brace may have a high dimensional accuracy and can be easily manufactured.

On the other hand, in the rear brace, since it is only necessary to provide a fixture portion to the body frame, and it is unnecessary to weld a large number of other fixture portions, the structure of the rear brace is made also extremely simple. Then, since the cowling brace is completed only by combining the front brace and the rear brace, a cowling brace with a simple structure and a high dimensional accuracy can easily be manufactured.

Furthermore, in the cowling brace of a motorcycle according to the present invention, since cushioning members made of an elastic material are disposed between the front brace and the rear brace, and the front brace is attached floatingly to the rear brace, a double floating portion can be provided between the cowling peripheral parts and the rear brace if the cowling peripheral parts are also attached floatingly to the front brace. The ability of vibration isolation of the cowling peripheral parts is extremely improved.

Moreover, in the cowling brace of a motorcycle according to the present invention, since the front brace is formed in shape of a ring surrounding the periphery of the head lamp in the front view, the rigidity of the own body of the front brace is increased so that the heavy head lamp or the like may stably be held.

It is to be noted that the present invention is not limited to the described embodiment and many other changes and modifications may be made without departing from the scopes of the appended claims.

What is claimed is:

1. A cowling brace of a motorcycle having a sub-frame structure for attaching a cowling and a cowling peripheral part to a front head portion of a body frame of a motorcycle, comprising:

a front brace member integrally formed of a synthetic resin material;

a rear brace member of a metal material to be combined with the front brace;

a front fixture member formed integrally with the front brace member and adapted to fix the cowling and the cowling peripheral part; and a rear fixture member formed to rear brace member and adapted to fix the rear brace member to the body frame.

2. A cowling brace of a motorcycle according to claim 1, further comprising a cushioning member formed of an elastic material and disposed between said front brace member and the rear brace member so that the front brace member is mounted to the rear brace member to be floatable.

3. A cowling brace of a motorcycle according to claim 1, wherein the front brace has a ring-shaped structure surrounding a periphery of a head lamp in a front view of the cowling brace.

4. A cowling brace of a motorcycle according to claim 3, wherein said ring-shaped structure comprises an annular peripheral frame portion and a vertical stay portion.

5. A cowling brace of a motorcycle according to claim 4, wherein a plurality of reinforcing rib members are formed integrally with a rear side of the annular peripheral frame portion of the front brace member.

6. A cowling brace of a motorcycle according to claim 1, wherein said cowling peripheral part includes a plurality of pieces and said front fixture member is composed of a plurality pieces.

7. A cowling brace of a motorcycle according to claim 1, wherein said rear brace member comprising a brace pipe, a brace holder welded to a rear edge of the brace pipe, an upper bracket and a lower bracket which are welded to upper and lower ends of the brace pipe.

8. A cowling brace of a motorcycle according to claim 1, wherein said front brace member is fastened to the cowling at a plurality of portions by fastening means.

* * * * *